Patented July 30, 1940

2,209,462

UNITED STATES PATENT OFFICE 2,209,462

PROCESS FOR PRODUCING SYNTHETIC OIL

Eugene Lieber, Linden, and Martin M. Sadlon, Roselle Park, N. J., assignors to Standard Oil Development Company, a corporation of Delaware No Drawing. Application July 24, 1937, Serial No. 155,438

11 Claims. (Cl. 196—78)

The present invention relates to an improved process for producing synthetic oil and more specifically for producing a wax modifying agent which may be used for reducing the pour point of waxy lubricating oils and for modifying the crystal growth and thus assist in dewaxing operations. The invention will be fully understood from the following description.

Synthetic oils are produced by halogenating waxy hydrocarbons and subsequently polymerizing the same or reacting them with suitable aromatic materials. Such condensation products are found to have valuable wax modifying properties; that is to say when such materials are added to wax containing lubricating oils, even in quite minute amounts, it is found that the pour point of the oils is reduced or depressed so that they are capable of flowing at temperatures considerably below those at which the unblended oils normally become solid. Such materials may also be used in dewaxing operations. For obscure reasons, the presence of small amounts of these materials inhibits the crystal growth of the wax and permits separation of wax from oil by centrifugation, settling or filtration much more rapidly and easily than in the absence of the modifying agent.

In former processes for producing modifying agents, the wax was chlorinated by passing free chlorine through the melted wax and the thus chlorinated wax was then condensed alone or with the aromatic material in the presence of a catalytic agent of aluminum chloride or other Friedel-Crafts type condensing agent such as zinc chloride, or ferric chloride. The reaction has been carried out both in the presence and in the absence of solvent materials.

It has now been discovered that superior materials of greater potency and generally improved properties can be produced by halogenating the wax while in the presence of a suitable solvent, which will be disclosed below, and subsequently condensing the halogenated wax on itself or with the aromatic compound as heretofore. The improvement appears to lie in the halogenation method.

The wax is first taken up in a solvent which is preferably used in a sufficient quantity to substantially completely dissolve the wax at ordinary room temperature, and chlorine gas is passed through the solution to effect the chlorination. If desired, this may be accomplished in the presence of catalytic agents such as bromine or iodine and when the wax has reached a chlorine content of, say from 10 to 25% by weight, as shown by the removal of a test sample, chlorination is terminated. The temperature of chlorination may be low, for example room temperature, or if desired, may be increased to increase the rate of reaction, for example up to 300° F., but it is undesirable to go much higher.

Any suitably unreactive solvent may be used to dissolve the wax during chlorination, for example carbon disulphide, but the stable halogenated solvents are preferred. Among these may be mentioned aliphatic compounds containing less than 5 carbon atoms, preferably 2 to 3 carbon atoms, and which also contain 3 or more substituted halogen atoms, among which solvents may be mentioned especially trichlor ethane, tetrachlor ethane, of either the symmetrical or unsymmetrical types, and pentachlor ethane or hexachlor ethane. The same derivatives of propane are also satisfactory as well as the unsaturated derivatives of two or three carbon atoms such as trichlor ethylene, trichlor propylene and the like. Another suitable type of solvent comprises the aromatic polychlorinated hydrocarbons such as di or trichlor benzol, or similar naphthalene compounds. The unalkylated ring compounds are preferred.

As has been stated above, chlorinated wax may be condensed on itself, but it is usually preferable to condense it on a suitable aromatic material, for example on aromatic hydrocarbons, such as benzol, toluol, xylol, naphthalene or anthrocene, or on phenol such as simple phenol, cresol or a naphthol or an anthrol, and it will be understood that while the mono-hydroxy compounds are preferable, di and trihydroxy compounds may be used. Hydro aromatic compounds such as hydro naphthalene or cyclo hexanol can also be used. The amount of the aromatic material may vary considerably, but it is best to provide about 10 to 15% based on the weight of the chlorinated wax. The reaction is carried out at temperatures ranging from room temperature to about 100° C. or somewhat higher, with catalysts such as aluminum chloride, or its recognized equivalents. The temperature is best adjusted with relation to the particular aromatic and the catalyst used and the amount of the catalyst is usually less than 5%, based on the chlor wax, although more can be used. The reaction is ordinarily carried out in from 2 to 6 hours, or longer.

To illustrate the nature of the improvements made in the present invention, the following comparative tests may be considered:

Different samples of the same wax (melting point 122° F.) were chlorinated to 11.0% chlorine by weight. In the first case the wax was melted and chlorine was passed through at a temperature of 100° C. until the specified chlorine content was reached. In the second case the wax was dissolved in 25 parts of penta chlor ethane and chlorine was passed through this solution at 100° C., until the proper chlorination of the wax was obtained.

Duplicate runs were then made with these two samples of chlorinated wax using 13.5 parts naphthalene per 100 parts of chlorinated wax in each case. Condensations took place at 40° C. in the presence of 1.4% parts by weight of aluminum chloride as catalyst. In the first case 25 parts of penta chlor ethane were added to the wax, which had been chlorinated in the absence of the solvent, and in the second case the solvent used during chlorination was retained so that in each case identical amounts of the same solvent were present during the condensation steps.

Small amounts of the two condensation products obtained were then added to different samples of the same waxy oil which had an original pour point of 30° F. When the amount of the pour depressant was .15%, the pour point of the oil was reduced to −15° F. by the product which was made in the usual manner, and was reduced to −25° F. by the product made according to the present invention, namely the sample which was produced from wax chlorinated in the presence of the solvent. Similarly there was an advantage of 5° F. in the depression obtained with this sample when the two depressants were added in proportion of .075% to samples of the same waxy oil.

A second waxy oil which also had a pour point of 30° F. was now used but in this case the oil was more viscous and of a type generally considered less susceptible to the action of pour inhibitors. The pour depressant made according to the present invention showed a pour depression greater by 5° F. than that made in the usual way when the amount of the depressant was .075% in each case and an advantage of 10° greater depression was obtained by that sample when the amount was .0375%.

The present invention is not to be limited by any theory of the mechanism of the reaction by which pour depressants are produced nor by any theory of the mechanism by which they reduce the pour point of the waxy oils, nor to any specific raw materials used, but only to the following claims in which it is desired to claim the invention as broadly as the art allows.

We claim:

1. In an improved process for producing wax modifying agents by condensation of chlorinated waxy hydrocarbons, the steps which comprise chlorinating a hydrocarbon wax in an unreactive solvent and then directly condensing the chlorinated wax-solvent solution by means of a catalyst of the aluminum chloride type.

2. Process according to claim 1 in which the condensation takes place with an iso-cyclic carbon compound.

3. Process according to claim 1 in which the condensation takes place with a suitable aromatic compound.

4. In a process for producing wax modifying agents by chlorinating waxy hydrocarbons and condensing the resultant products with aromatic compounds in the presence of a catalyst of the type of aluminum chloride, the improvement which comprises conducting the halogenation and condensation reactions in the same non-reactive normally liquid halogenated organic compound as a solvent.

5. Process according to claim 4, in which the solvent comprises an aliphatic compound of 2 to 5 carbon atoms and containing at least 3 halogen atoms.

6. Process according to claim 4 in which the solvent comprises an aliphatic hydrocarbon of 2 to 3 carbon atoms and containing at least 3 halogen atoms.

7. Process according to claim 4 in which the solvent consists of a chlorinated hydrocarbon with 2 to 3 carbon atoms and at least 3 chlorine atoms.

8. Process according to claim 4 in which the wax is halogenated by direct action of free chlorine while in the presence of a penta chlor ethane as a solvent.

9. The process which comprises chlorinating a solution of paraffin wax dissolved in pentachlor ethane, adding to said solution an iso-cyclic carbon compound and condensing in the presence of a Friedel-Crafts type catalyst.

10. In a process for producing wax modifying agents by chlorinating waxy hydrocarbons and condensing the resulting products with iso-cyclic carbon compounds in the presence of a Friedel-Crafts type catalyst, the improvement which comprises carrying out the entire process in an inert liquid poly-chlorinated hydrocarbon.

11. A process for producing wax modifying agents which comprises passing chlorine thru a solution of paraffin wax dissolved in an inert poly-halo aliphatic hydrocarbon containing at least 2 carbon atoms, at a temperature of about 100° C., until the product contains at least 11% by weight of chlorine, cooling the resultant mixture to 40° C. and adding and condensing naphthalene therewith in the presence of aluminum chloride.

EUGENE LIEBER.
MARTIN M. SADLON.